United States Patent
Maeda et al.

(10) Patent No.: US 8,444,224 B2
(45) Date of Patent: May 21, 2013

(54) SEAT CONTROLLING MECHANISM (75) Inventors: Misato Maeda, Kariya (JP); Kazuyuki Kashiwabara, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 348 days.

(21) Appl. No.: 12/858,885

(22) Filed: Aug. 18, 2010

(65) Prior Publication Data
US 2011/0043018 A1    Feb. 24, 2011

(30) Foreign Application Priority Data
Aug. 21, 2009   (JP) .................................. 2009-192574

(51) Int. Cl.
*A47C 1/00*   (2006.01)

(52) U.S. Cl.
USPC ..... 297/341; 297/337; 297/378.1; 318/568.1; 318/603; 318/103

(58) Field of Classification Search
USPC .................... 297/337, 341, 378.1; 318/568.1, 318/603, 103
See application file for complete search history.

(56) References Cited

U.S. PATENT DOCUMENTS

| | | | | |
|---|---|---|---|---|
| 4,547,718 A | * | 10/1985 | Ratzel et al. | 318/568.1 |
| 4,698,571 A | * | 10/1987 | Mizuta et al. | 318/568.1 |
| 5,004,967 A | * | 4/1991 | Ogasawara | 318/568.1 |
| 5,529,372 A | * | 6/1996 | Cohen | 297/217.3 |
| 5,717,300 A | * | 2/1998 | Baloche et al. | 318/282 |
| 7,239,096 B2 | * | 7/2007 | Hancock et al. | 318/59 |
| 2006/0208549 A1 | * | 9/2006 | Hancock et al. | 297/342 |

FOREIGN PATENT DOCUMENTS

| | | |
|---|---|---|
| JP | 2004-203122 A | 7/2004 |
| JP | 2005-278363 A | 10/2005 |

* cited by examiner

*Primary Examiner* — Laurie Cranmer
(74) *Attorney, Agent, or Firm* — Buchanan Ingersoll & Rooney PC (57) ABSTRACT

A seat controlling mechanism includes motors for actuating a plurality of seat sections, a position detecting apparatus detecting positions of the seat sections and a controlling apparatus controlling the seat sections to move to a predetermined position, wherein an interfering range, an interference avoidable range in which an interference avoidance control is executed and a normal operation range are set in the controlling apparatus, and when at least one of the seat sections positions in the interference avoidable range, the controlling apparatus prohibits the movement of the at least one of the seat sections toward the interfering range.

9 Claims, 5 Drawing Sheets

SEAT CONTROLLING MECHANISM

CROSS REFERENCE TO RELATED APPLICATIONS

This application is based on and claims priority under 35 U.S.C. §119 to Japanese Patent Application 2009-192574, filed on Aug. 21, 2009, the entire content of which is incorporated herein by reference.

TECHNICAL FIELD

This disclosure relates to a seat controlling mechanism for operating a plurality of seat sections, such as a seat back member and a seat cushion member, so as to move to predetermined positions, respectively, while avoiding an interference with each other, the seat back member and the seat cushion member being provided to move so as to follow moving paths interfering with each other.

BACKGROUND DISCUSSION

Disclosed in JP2004-203122A is a seat controlling apparatus for moving a seat having a seat back member, a seat cushion member and the like. Specifically, the seat controlling apparatus controls a reclining operation of the seat in such a way that the seat back member pivots by a larger rotational angle relative to the seat cushion member while avoiding an interference between the seat back member and rear components such as a rear seat provided at the rear of the seat. When the seat back member is reclined relative to the seat cushion member, once a rotational angle and a position of the seat reaches predetermined thresholds, the seat controlling apparatus executes a seat slide control, by which the rotational angle of the seat back member relative to the seat cushion member may be enlarged while avoiding the interference between the seat back member and the rear components such as the rear seat or the like.

Disclosed in JP2005-278363A is a controlling apparatus, by which a control is executed for plural motors each having an individual characteristics or a load, in such a way that a rotational speed of each motor is changed in order to drive the motor within a tolerance range of the control. According to the controlling apparatus disclosed in JP2005-278363A, because an actuation of each of the plural motors is controlled on the basis of a unified criterion such as a standard actuation amount, calculation processes for the control may be simplified.

According to the seat controlling apparatus disclosed in JP2004-203122A, the seat back member of the seat may pivot within the larger rotational angle, by sliding the vehicle seat in accordance to a reclining amount inputted by a user, while avoiding an interference of the seat back member with the rear components. However, the seat controlling apparatus disclosed in JP2004-203122A may not be used for moving the seat back member so as to be a set position, while avoiding the interference of the seat back member with the rear components and achieving a reduction of time required for moving the seat back member to the set position.

According to the controlling apparatus disclosed in JP2005-278363A, because the control of the actuation of each motor is executed on the basis of the unified criterion such as the standard actuation amount, although calculation processes for the control may be simplified, because the control for changing the speed of each motor is still needed, compared to another controlling apparatus in which a speed control of a motor is not executed, costs of the controlling apparatus of JP2005-278363A, by which a calculation for the speed control of the motor is executed, can be high.

A need thus exists to provide a seat controlling mechanism, which is not susceptible to the drawback mentioned above.

SUMMARY

According to an aspect of this disclosure, a seat controlling mechanism includes motors for actuating a plurality of seat sections, respectively, the seat sections being movable on moving paths, respectively, the moving paths being interfering with each other, a position detecting apparatus detecting a position of each of the seat sections and a controlling apparatus controlling each of the seat sections so as to move to a predetermined position, wherein an interfering range, an interference avoidable range in which an interference avoidance control is executed and a normal operation range are set in the controlling apparatus, the interfering range being set on the basis of positions of the seat sections, the interference avoidable range being set so as to abut the interfering range, the normal operation range being set so as not to be included in the interfering range and the interference avoidable range, and when at least one of the seat sections positions in the interference avoidable range, the controlling apparatus prohibits the movement of the at least one of the seat sections toward the interfering range.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a seat controlling mechanism related to this disclosure will be explained with reference to FIGS. 1 through 7.

Figure 1:
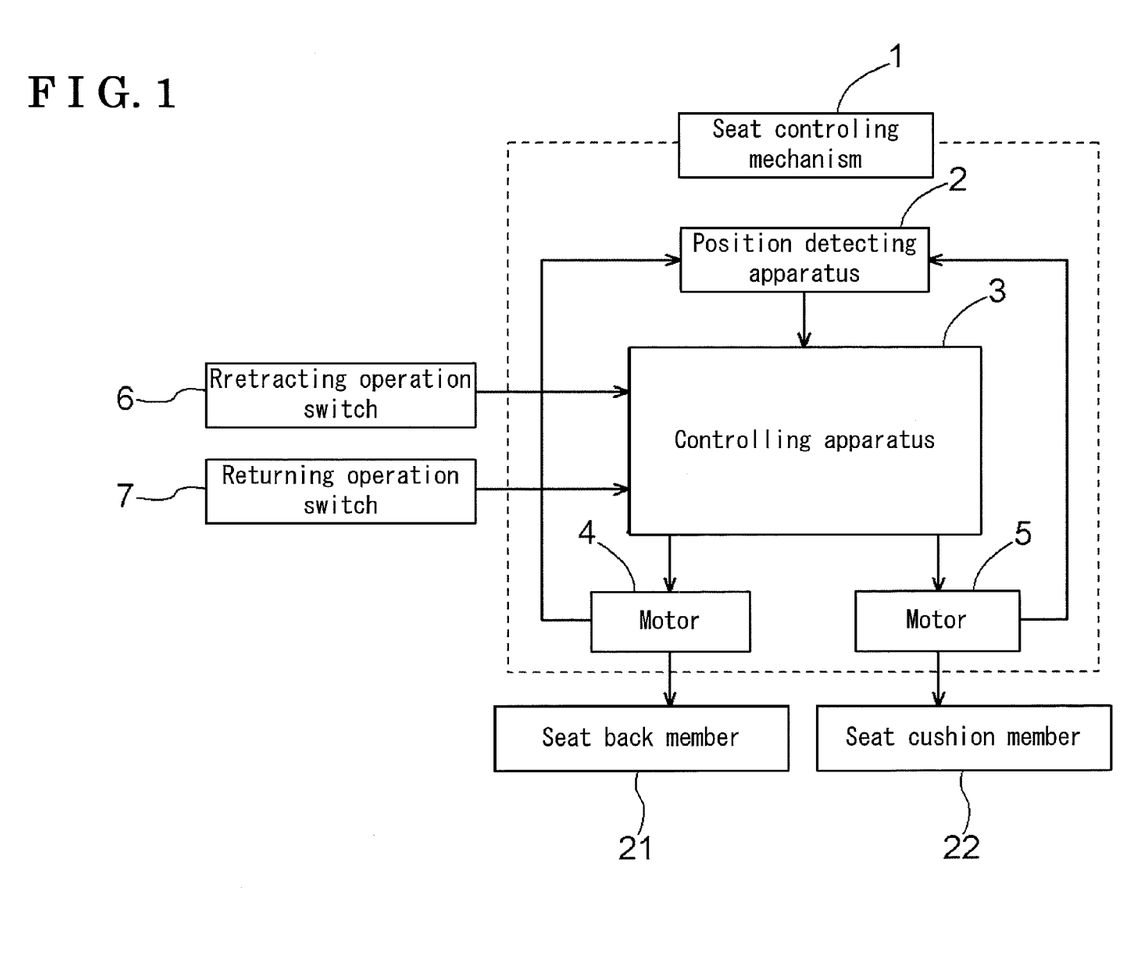
FIG. 1 is a configuration diagram indicating a seat controlling mechanism related to this disclosure.

FIG. 1 is a configuration diagram of a seat controlling mechanism 1 related to the embodiment. The seat controlling mechanism 1 includes a position detecting apparatus 2, a controlling apparatus 3, a motor 4 for moving a seat back member 21 and a motor 5 for moving a seat cushion member 22. Each of the motors 4 and 5 is a constant speed motor. The position detecting apparatus 2 detects positions of the seat back member 21 and the seat cushion member 22, respectively, on the basis of rotation pulses of the motors 4 and 5, respectively. Detected positions of the seat back member 21 and the seat cushion member 22 are sent to the controlling apparatus 3 as position data, and the controlling apparatus 3 determines whether each of the seat back member 21 and the seat cushion member 22 positions in an interfering range (e.g., an interfering range X) or an interference avoidable range (e.g., first interference avoidable ranges P and Q and second interference avoidable ranges R and S). Then, the controlling apparatus 3 controls the motors 4 and 5, respectively, on the basis of the position of the seat back member 21 and the seat cushion member 22 (e.g., the interfering range or the interference avoidable range), thereby moving the seat back member 21 and the seat cushion member 22 to the predetermined positions, respectively, while avoiding an interference between the seat back member 21 and the seat cushion member 22. A retracting operation switch 6 and a returning operation switch 7 are switches by which signals of a start of a retracting operation and a start of a returning operation are sent to the controlling apparatus 3. The retracting operation indicates an operation by which the seat is moved to a retracted position, and the returning operation indicates an operation by which the seat is moved to a seating position.

Figure 2:
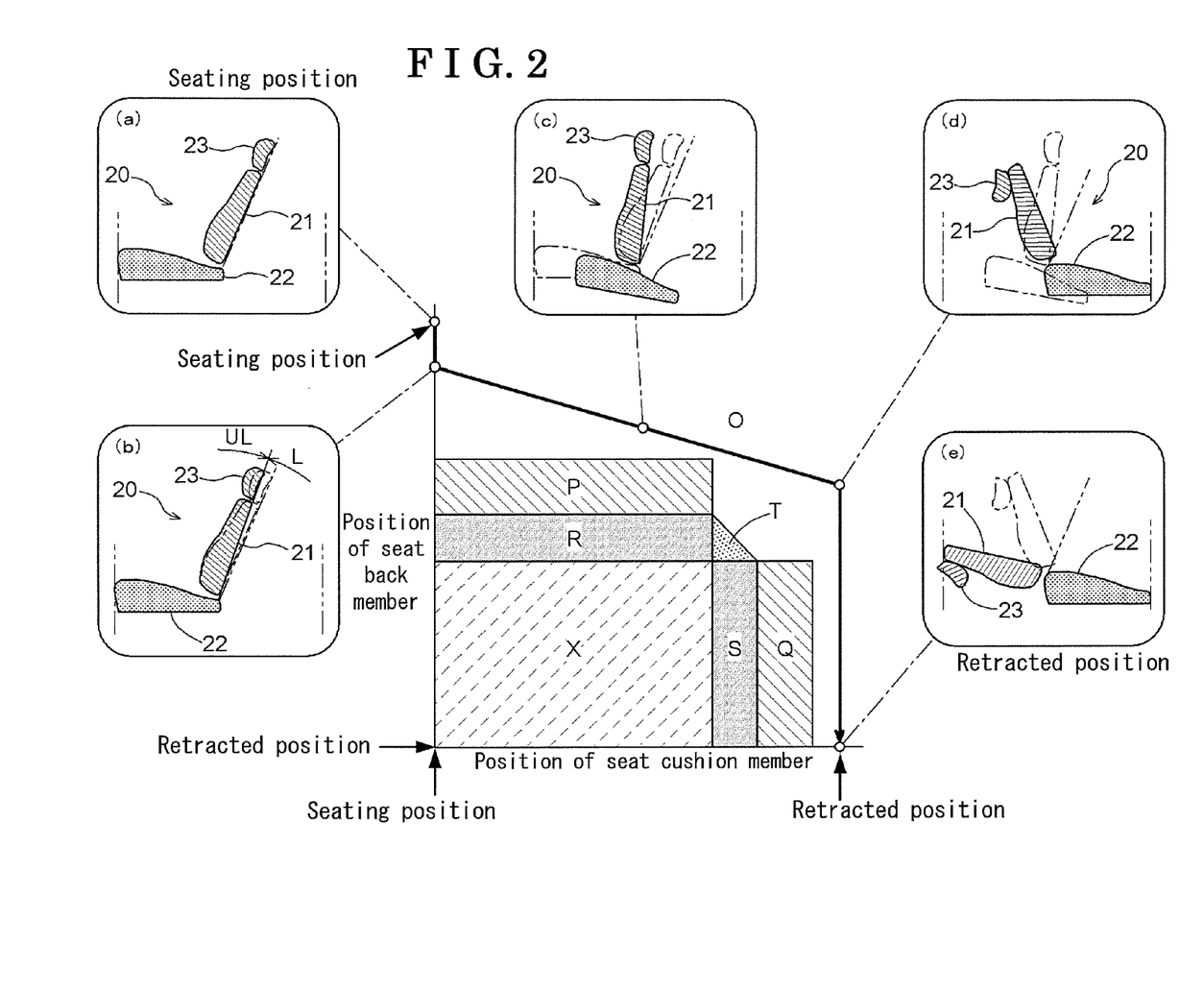
FIG. 2 is an actuation map and explanation diagrams indicating a sequence of a seat retracting operation.

FIG. 2 is an actuation map and explanation diagrams indicating a sequence of a seat retracting operation (hereinafter simply referred to as a retracting operation) by use of the seat controlling mechanism 1. A vertical axis of the actuation map indicates a position of the seat back member 21. An upper end of the vertical axis of the map is set to the seating position, and a lower end of the vertical axis of the map is set to the retracted position. A horizontal axis of the map indicates a position of the seat cushion member 22. A left end of the horizontal axis of the map is set to the seating position, and a right end of the horizontal axis of the map is set to the retracted position. Actuations of the seat back member 21 and the seat cushion member 22 upon the retracting operation are indicated by a directional bold line. The seat described in this disclosure is located at the end row of the vehicle (hereinafter referred to as a seat 20), and when the seat 20 is actuated to be the retracted position, the seat is turned in a flat state as illustrated in the diagram (e) of FIG. 2. The seat 20 includes the seat back member 21, the seat cushion member 22 and a head rest member 23. The head rest member 23 is attached to an upper portion of the seat back member 21 and is moved integrally with the seat back member 21.

The diagram (a) of FIG. 2 indicates a state where the seat 20 is in the seating position. Once the retracting operation switch 6 is operated, the seat back member 21 starts to be tilted forward, while the seat cushion member 22 is not moved. Specifically, when the seat back member 21 positions in a lock range L including the seating position, a movement of the seat cushion member 22 is prohibited in order to prevent the seat cushion member 22 from being moved by an impact caused by a vehicle collision. The diagram (b) of FIG. 2 indicates a state where the seat back member 21 is positioned in the vicinity of a border between the lock range L and the unlock range UL. The determination whether the seat back member 21 positions in the lock range L or the unlock range UL is executed as follows. Firstly, the position detecting apparatus 2 detects a position of the seat back member 21 on the basis of a rotation pulse of the motor 4, and then the controlling apparatus 3 determines whether the seat back member 21 positions in the lock range L or the unlock range UL.

Once the seat back member 21 is tilted forward so as to be in the unlock range UL, specifically once the seat back member 21 is tilted forward in such a way that the seat back member 21 entirely positions within the unlock range UL, the seat cushion member 22 starts to be moved rearward. The diagram (c) of FIG. 2 indicates a state where the seat back member 21 is tilted forward within the unlock range UL and the seat cushion member 22 is moved rearward. As the retracting operation further proceeds, as indicated in the diagram (d) of FIG. 2, the seat cushion member 22 reaches the retracted position, and the motor 5 is stopped. Even after the seat cushion member 22 reaches the retracted position, the seat back member 21 is further tilted forward, and once the seat back member 21 reaches the retracted position as indicated in the diagram (e) of FIG. 2, the motor 4 is stopped, and the retracting operation is completed. The head rest member 23 is rotatable relative to the seat back member 21 at an appropriate timing during the forward tilt operation of the seat back member 21. The returning operation in which each of the seat back member 21 and the seat cushion member 22 is moved from the retracted position to the seating position is executed in a reversed flow of the retracting operation.

A range X in the map of FIG. 2 indicates the interfering range in which the seat back member 21 interferes with the seat cushion member 22. Each of ranges P and Q indicates the first interference avoidable range, each of ranges R and S indicates the second interference avoidable range, and a range T indicates a third interference avoidable range. An interference avoidance control, which will be explained below, is executed in the first, second and third ranges. A range O indicates a normal operation range that is not included in the interfering range and the interference avoidable range. Each range is set in accordance with shapes of the seat back member 21 and the seat cushion member 22, a pass of the movements of the seat back member 21 and the seat cushion member 22, rotational speeds of the motors and the like. The retracting operation of indicated in FIG. 2 is an example where the seat back member 21 and the seat cushion member 22 are actuated within the normal operation range O, without entering any of the interference avoidable ranges. The returning operation, in which the seat back member 21 and the seat cushion member 22 are moved from the retracted position to the seating position, is executed by following a reversed direction of the directional bold arrow shown in the map of FIG. 2.

Because the motors 4 and 5 are constant speed motors, each of the motors 4 and 5 is actuated so as to be in three conditions, a first condition being rotating in a direction for moving the seat back member 21 and the seat cushion member 22 to the retracted position, a second condition being rotating in a direction for moving the seat back member 21 and the seat cushion member 22 to the seating position, and a third condition being stopping. Within the normal operation range O, by a combination of the three conditions of each of the motors 4 and 5, the seat back member 21 and the seat cushion member 22 are actuated in such a way that a point indicating a position of the seat back member 21 and a point indicating a position of the seat cushion member 22 in the actuation map of FIG. 2 are proceeded (e.g., moved) in eight directions, a upper, a lower, a right, a left, a upper-right, an upper-left, a lower-right and a lower-left directions.

Within the first interference avoidable range P set above the interfering range X, a movement of the seat back member 21 so as to reach the interfering range X is prohibited. In other words, the movements of the seat back member 21 and the seat cushion member 22 are restricted in such a way that the point indicating positions of the seat back member 21 and the seat cushion member 22 is moved only in the upper, the right, the left, the upper-right and the upper left directions within the first interference avoidable range P. Further, within the first interference avoidable range Q set at the right of the interfering range X, a movement of the seat cushion member 22 so as to reach the interfering range X is prohibited. In other words, the movements of the seat back member 21 and the seat cushion member 22 are restricted in such a way that the point indicating positions of the seat back member 21 and the seat cushion member 22 is moved only in the upper, the lower, the right, the upper-right and the lower-right directions within the first interference avoidable range Q.

Within the second interference avoidable range R set between the first interference avoidable range P and the interfering range X, the movement of the seat back member 21 is restricted in such a way that the seat back member 21 is not moved in a direction so as to reach the interfering range X, and any movement of the seat cushion member 22 is prohibited. In other words, the point indicating the seat back member 21 and the seat cushion member 22 is moved only in the upper direction within the second interference avoidable range R. Further, within the second interference avoidable range S set between the first interference avoidable range Q and the interfering range X, the movement of the seat cushion member 22 is restricted in such a way that the seat cushion member 22 is not moved in a direction so as to reach the interfering range X, and any movement of the seat back member 21 is prohibited. In other words, the point indicating the seat back member 21 and the seat cushion member 22 is moved only in the right direction within the second interference avoidable range S.

Within the third interference avoidable range T, being set at the right of the second interference avoidable range R and above the second interference avoidable range S, the movements of the seat back member 21 and the seat cushion member 22 are restricted in such a way that both of the seat back member 21 and the seat cushion member 22 are not moved in a direction so as to reach the interfering range X. In other words the point indicating the seat back member 21 and the seat cushion member 22 is moved only in the right, the upper and the upper-right directions within the third interference avoidable range T.

The abovementioned ranges are specified by a formula in which positions of the seat back member 21 and the seat cushion member 22 are set as variable numbers. Thus, compared to a known manner in which the ranges are independently set, the ranges are set without any missing area, thereby increasing a level of accuracy of the interference avoidance control.

Figure 3:
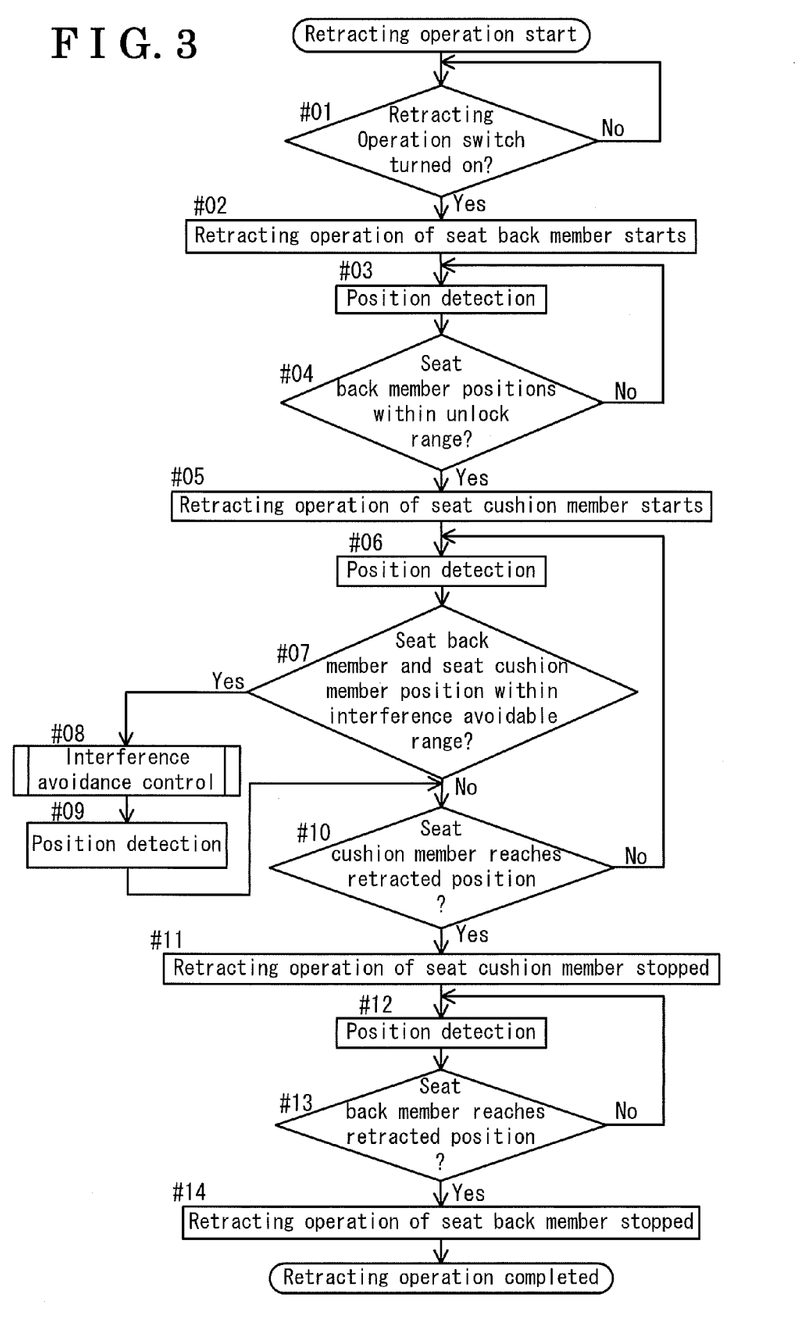
FIG. 3 is a flowchart indicating a flow of the seat retracting operation executed by a seat controlling mechanism.

Next, a flow of the retracting operation of the seat 20 by means of the seat controlling mechanism 1 related to the embodiment will be explained on the basis of a flowchart of FIG. 3. Firstly, once the retracting operation switch 6 is operated (the retracting operation switch 6 is turned on in #01), the retracting operation of the seat back member 21 is started (#02). Then, the position detecting apparatus 2 detects a position of the seat back member 21 (#03) when the position detecting apparatus 2 detects that the seat back member 21 entirely positions within the unlock range UL (#04), the retracting operation of the seat cushion member 22 is started (#05).

Then, the position detecting apparatus 2 detects positions of the seat back member 21 and the seat cushion member 22 (#06), and when the positions of the seat back member 21 and the seat cushion member 22 are determined so as to position within the interference avoidable range (#07), the seat controlling mechanism 1 executes the interference avoidance control (#08). When the seat back member 21 and the seat cushion member 22 are moved so as to be out of the interference avoidable range by means of the interference avoidance control, the position detecting apparatus 2 detects positions of the seat back member 21 and the seat cushion member 22 (#09). Then, a determination whether or not the seat cushion member 22 reaches the retracted position is executed (#10). The seat back member 21 and the seat cushion member 22 are determined not to be positioning within the interference avoidable range (#07), the determination whether or not the seat cushion member 22 reaches the retracted position is continuously executed (#10).

When the seat cushion member 22 is determined so as to reach the retracted position (#10), the controlling apparatus 3 operates to stop the actuation of the seat cushion member 22 by stopping the motor 5 (#11). Then, the position detecting apparatus 2 continuously detects positions of the seat back member 21 and the seat cushion member 22 (#12). When the seat back member 21 is determined so as to reach the retracted position (#13), the controlling apparatus 3 operates to stop the actuation of the seat back member 21 by stopping the motor 4, accordingly the retracting operation is completed.

Figure 4:
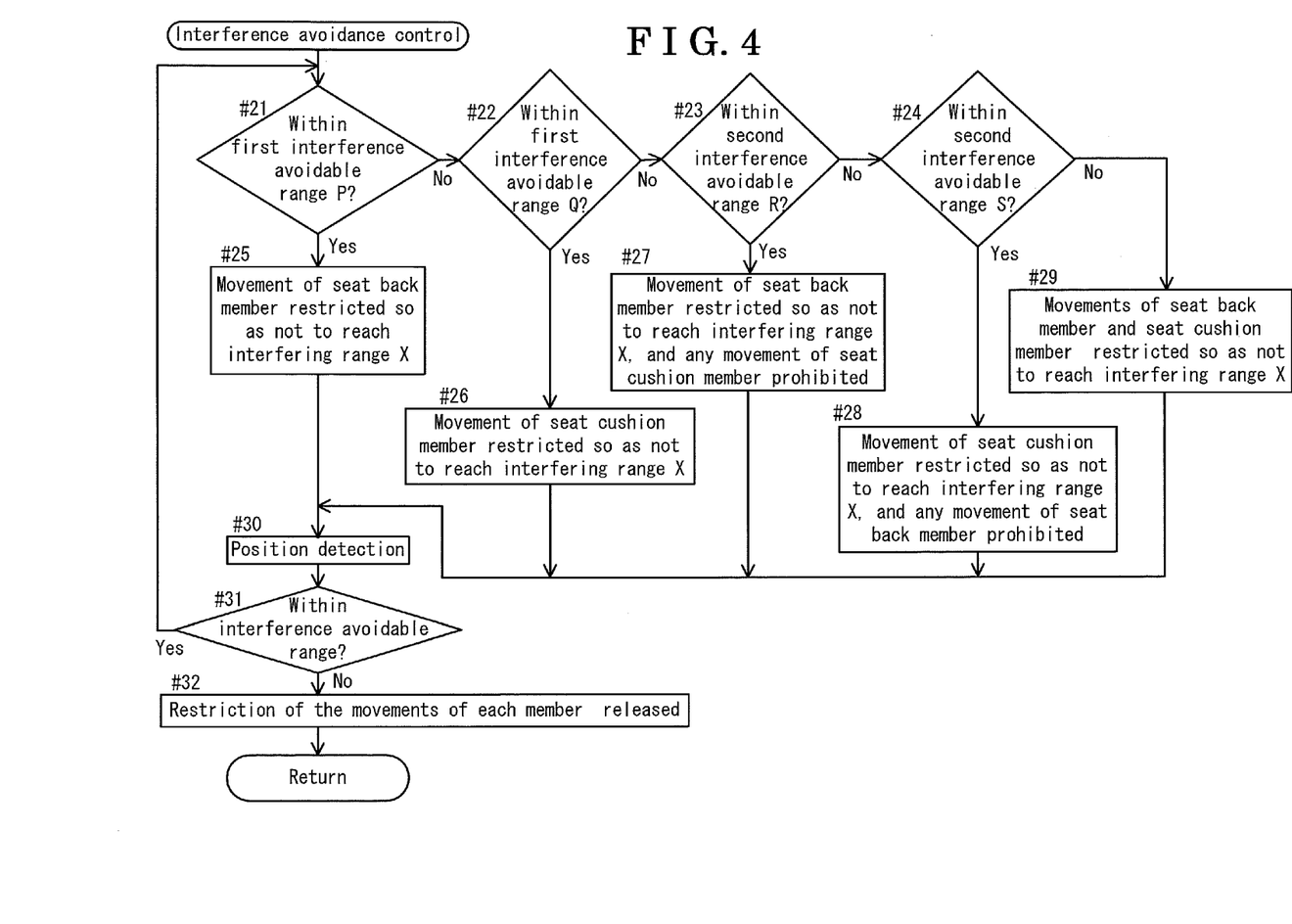
FIG. 4 is a flowchart indicating a flow of an interference avoidance control.

A flow of the interference avoidance control will be explained in detail in accordance with a flowchart of FIG. 4. The determinations that each of the seat back member 21 and the seat cushion member 22 positions in which interference avoidable range are executed (#21 through #24). When each of the seat back member 21 and the seat cushion member 22 is determined so as to position within the first interference avoidable range P (#21), the movement of the seat back member 21 is restricted in such a way that the seat back member 21 is not moved in a direction so as to reach the interfering range X (#25). When each of the seat back member 21 and the seat cushion member 22 is determined so as to position within the first interference avoidable range Q (#22), the movement of the seat cushion member 22 is restricted in such a way that the seat cushion member 22 is not moved in a direction so as to reach the interfering range X (#26). When each of the seat back member 21 and the seat cushion member 22 is determined so as to position within the second interference avoidable range R (#23), the movement of the seat back member 21 is restricted in such a way that the seat back member 21 is not moved in a direction so as to reach the interfering range X, and any movement of the seat cushion member 22 is prohibited (#27). When each of the seat back member 21 and the seat cushion member 22 is determined so as to position within the second interference avoidable range S (#24), the movement of the seat cushion member 22 is restricted in such a way that the seat cushion member 22 is not moved in a direction so as to reach the interfering range X, and any movement of the seat back member 21 is prohibited (#28). When each of the seat back member 21 and the seat cushion member 22 is determined so as to position within the third interference avoidable range T (#24), the movements of the seat back member 21 and the seat cushion member 22 are restricted in such a way that both of the seat back member 21 and the seat cushion member 22 are not moved in a direction so as to reach the interfering range X (#29).

After each of the interference avoidance controls is executed, the positions of the seat back member 21 and the seat cushion member 22 are detected (#30). When the seat back member 21 and the seat cushion member 22 are determined so as to be out of the interference avoidable range (#31), the restriction of the movement of each member by means of the interference avoidance control is released (#32). On the other hand, when the seat back member 21 and the seat cushion member 22 are determined so as to position within the interference avoidable range (#31), the interference avoidance control is repeated.

Next, actuations of the seat back member 21 and the seat cushion member 22 in a case where the interference avoidance control is executed upon the retracting operation of the seat 20 will be explained on the basis of FIGS. 5 and 6.

Figure 5:
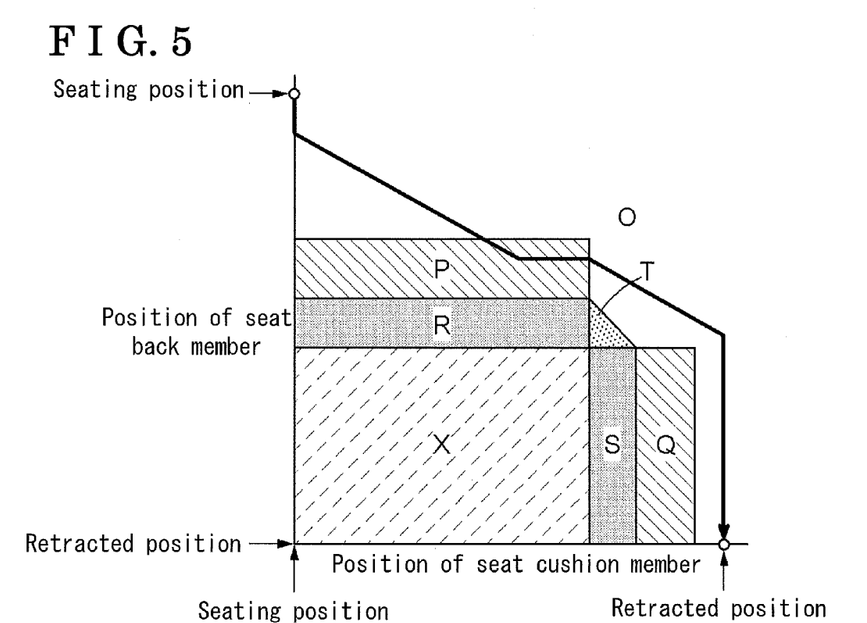
FIG. 5 is an actuation map in a case where the interference avoidance control is executed upon the seat retracting operation.

FIG. 5 is an example of a case where the position detecting apparatus 2 detects that the seat back member 21 and the seat cushion member 22 are positioned within the first interference avoidable range P, and then the interference avoidance control is executed. In this case, a movement of the seat back member 21 so as to reach the interfering range X is prohibited. On the other hand, because the retracting operation of the seat cushion member 22 is continued while the movement of the seat back member 21 in the direction reaching the interfering range X is prohibited, the point indicating the positions of the seat back member 21 and the seat cushion member 22 are moved in the rightward direction. Then, once the point indicating the positions of the seat back member 21 and the seat cushion member 22 departs the first interference avoidable range P and enters the normal operation range O again, the retracting operation of the seat back member 21 is re-started. According to the interference avoidance control mentioned above, a length of time for executing the retracting operation may be shortened compared to the known control in which one member is temporarily returned to the seating position.

Figure 6:
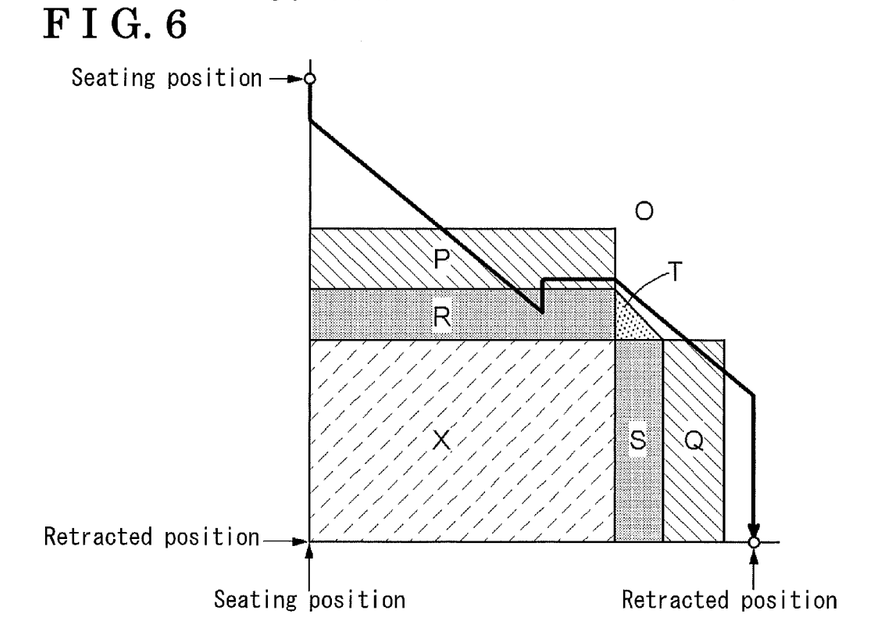
FIG. 6 is an actuation map in a case where the interference avoidance control is executed upon the seat retracting operation.

FIG. 6 is an example of a case where the position detecting apparatus 2 detects that the seat back member 21 and the seat cushion member 22 are positioned within the second interference avoidable range R, and then the interference avoidance control is executed. Because the abovementioned interference avoidance control is executed within the first interference avoidable range P, it is unexpected that the seat back member 21 and the seat cushion member 22 are moved in the second interference avoidable range R. However, within each interval of the position detection by the position detecting apparatus 2, the seat back member 21 and the seat cushion member 22 may be moved in such a way that the point indicating the positions of the seat back member 21 and the seat cushion member 22 passes the first interference avoidable range P and enters the second interference avoidable range R. In such case, because the second interference avoidable range R is set in order to execute the interference avoidance control therewithin, a level of certainty of the interference avoidance control may be increased.

Within the second interference avoidable range R, the movement of the seat back member 21 in a direction so as to reach the interfering range X is prohibited, and any movement of the seat cushion member 22 is prohibited. In other words, the movement of the seat back member 21 is only allowed in a direction so as to be apart from the interfering range X. In FIG. 6, the movement of the point indicating the seat back member 21 and the seat cushion member 22 is only allowed in an upward direction. When the point indicating the seat back member 21 and the seat cushion member 22 departs the second interference avoidable range R and enters the first interference avoidable range P, the above-mentioned interference avoidance control is executed, and then the seat 20 is actuated in such a way that the point indicating the seat back member 21 and the set cushion member 22 is moved in the rightward direction.

After the point indicating the seat back member 21 and the seat cushion member 22 enters the normal operation range O again, in a case where the point indicating the positions of the seat back member 21 and the seat cushion member 22 enters the first interference avoidable range Q, the movement of the seat cushion member 22 in the direction so as to reach the interfering range X is prohibited. However, during the retracting operation of the seat 20, because the seat cushion member 22 is moved in a manner where the point indicating the seat cushion member 22 is moved rightward so as to be away from the interfering range X, this control does no make substantive sense. This is to be significance when the seat cushion member 22 is moved in a leftward direction in FIGS. 5 and 6, that is executing the returning operation.

When the point indicating the seat back member 21 and the seat cushion member 22 is in the second interference avoidable range R, the movement of the seat back member 21 in a direction so as to apart from the interfering range X and to reach the seat position may be automatically controlled or may be controlled by means of the returning operation switch 7 operated by the user after the movements of both of the seat back member 21 and the seat cushion member 22 are stopped.

In the similar way to the interference avoidance control of the retracting operation, an interference avoidance control of the returning operation may be explained by replacing the seat back member 21 with the seat cushion member 22, replacing the seat cushion member 22 with the seat back member 21, replacing the first interference avoidable range P with the first interference avoidable range Q and replacing the second interference avoidable range R with the second interference avoidable range S, in the above explanation.

According to the embodiment, the interference avoidance control in each interference avoidable range is executed by repeatedly allowing and stopping the movements of the seat back member 21 and the seat cushion member 22, that is by repeatedly actuating and stopping the motors 4 and 5, accordingly, a speed control of each of the motors 4 and 5 may not be executed. Thus, the configuration of the controlling apparatus 3 may be simplified, thereby decreasing the costs of the controlling apparatus 3. Further, because the actuations of the motors 4 and 5 for the interference avoidance control are simplified, a control error may be restrained.

According to the embodiment, the interfering range X in which the seat back member 21 interferes with the seat cushion member 22 is set, and the interference avoidable range is also set so as to abut the interfering range X. The interference avoidance control for the seat back member 21 and the seat cushion member 22 are executed on the basis of the set ranges. However, the interference avoidance control in the embodiment may be modified in such a way that, an interfering range is set to be a range where the seat back member 21 contacts a vehicle body during a reclining operation of the seat back member 21 to be above a certain level, and an interference avoidable range is set in front of the set interfering range, in order to avoid such contact in advance.

According to the embodiment, each range is set so as to be parallel to each of the vertical and horizontal lines in the actuation map, however, the ranges may be set in any form. For example, each range may be set so as to have an angle to the vertical axis and/or the horizontal axis, or each range may be set by a curbed line.

Application of this disclosure may not be limited to the retracting and returning operations of the seat back member and the seat cushion member, and may be applied to an opening-closing operation of another components such as a roof panel for a vehicle having an open roof, a luggage panel and a package tray.

In this configuration, because of the interference avoidable range in which the interference avoidance control for the plurality of the seat sections is executed, the plurality of the seat sections are prevented from being interfering with each other so that a complete stop of the movement of the seat sections due to the interference may be avoidable. Further, the interference avoidance control is executed in such a way that a movement of one of the seat sections is prohibited, while a movement of another of the seat sections is continued. Accordingly, a total time required to move the plurality of the seat sections to the predetermined position may be shortened. Furthermore, because the interference avoidance control is executed by allowing the movement of the seat sections in one direction and in the other direction and by stopping the movement of the seat sections, without speed controlling of the motors, accordingly the costs of the controlling apparatus may be decreased.

According to this disclosure, the position detecting apparatus detects the positions of the seat sections on the basis of rotation pulses of the motors, respectively.

In this configuration, because the positions of the seat sections may be detected on the basis of the rotation pulses of the motors used for driving the plurality of the seat sections, compared to a case where the position of the seat section is detected on the basis of an actual movement of the seat section, the time required for detecting the positions of the seat sections may be shortened. Accordingly, position data of the plurality of the seat sections may be rapidly transmitted to the controlling apparatus from the position detecting apparatus, thereby reducing a time lag in the control.

According to this disclosure, each of the motors is a constant speed motor.

In this configuration, because the speed of the motor is not controlled, the calculation process in the controlling apparatus may be simplified. Accordingly, a time required for the calculation may be shortened, thereby decreasing the costs of the controlling apparatus.

According to an aspect of this disclosure, each of the interfering range and the interference avoidable range is set by a formula in which variable numbers indicating positions of the seat sections are used.

Compared to a known manner in which the ranges are independently set, because the interfering range and the interference avoidable range are set by use of formulas in the configuration of this disclosure, the ranges are set without any missing area, thereby increasing a level of accuracy of the interference avoidance control.

According to this disclosure, the interference avoidable range includes: a first interference avoidable range in which movements of the seat sections in directions reaching the interfering range are prohibited; and a second interference avoidable range, being set between the interfering range and the first interference avoidable range, in which a movement of one of the seat sections in any direction is prohibited, and a movement of the other of the seat sections in a direction reaching the interfering range is prohibited.

In this configuration, because of the second interference avoidable range in which the interference avoidance control is executed in such a way that the movement of one of the seat sections is prohibited, and the movement of another of the seat sections is restricted so as not to reach the interfering range, a level of certainty of the interference avoidance control may be increased. Further, within the first interference avoidable range, as long as the plurality of the seat sections are moved so as to reach the interfering range, the movement may be continued. Accordingly, the time required for moving the seat sections to the predetermined position may be reduced, while avoiding the interference.

According to this disclosure, the seat sections include a first seat section and a second seat section, and the interference avoidable range includes: a first interference avoidable range in which a movement of the first seat section toward a retracted position is prohibited, when the seat sections are moved to the retracted position; and a second interference avoidable range, being set between the interfering range and the first interference avoidable range, in which a movement of the first seat section toward the retracted position is prohibited, and a movement of the second seat section in any direction is prohibited.

In this configuration, because of the second interference avoidable range in which only the movement of the first seat section is allowed in a direction away from the interfering range, a level of certainty of the interference avoidance control may be increased. Further, within the first interference avoidable range, the movement of the second seat section toward the retracted position may not be stopped, accordingly the seat sections may be moved to the predetermined position without loss of time, while avoiding the interference with each other.

According to this disclosure, the seat sections include a first seat section and a second seat section, and the interference avoidable range includes: a first interference avoidable range in which a movement of the second seat section toward a seating position is prohibited, when each of the seat sections is moved to the seating position; and a second interference avoidable range, being set between the interfering range and the first interference avoidable range, in which a movement of the second seat section toward the seating position is prohibited, and a movement of the first seat section in any direction is prohibited.

In this configuration, because of the second interference avoidable range in which only the movement of the second seat section is allowed in a direction away from the interfering range, a level of certainty of the interference avoidance control may be increased. Further, within the first interference avoidable range, the movement of the first seat section toward the seating position may not be stopped, accordingly the seat sections may be moved to the predetermined position without loss of time, while avoiding the interference with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat controlling mechanism comprising:
motors for actuating a plurality of seat sections, respectively, the seat sections being movable on moving paths, respectively, the moving paths interfering with each other;
a position detecting apparatus detecting a position of each of the seat sections; and
a controlling apparatus controlling each of the seat sections so as to move to a predetermined position, wherein an interfering range, an interference avoidable range in which an interference avoidance control is executed and a normal operation range are set in the controlling apparatus, the interfering range being set on the basis of positions of the seat sections, the interference avoidable range being set so as to abut the interfering range, the normal operation range being set so as not to be included in the interfering range and the interference avoidable range, and when at least one of the seat sections positions in the interference avoidable range, the controlling apparatus prohibits the movement of the at least one of the seat sections toward the interfering range.

2. The seat controlling mechanism according to claim 1, wherein the position detecting apparatus detects the positions of the seat sections on the basis of rotation pulses of the motors, respectively.

3. The seat controlling mechanism according to claim 1, wherein each of the motors is a constant speed motor.

4. The seat controlling mechanism according to claim 1, wherein each of the interfering range and the interference avoidable range is set by a formula in which variable numbers indicating positions of the seat sections are used.

5. The seat controlling mechanism according to claim 1, wherein the interference avoidable range includes: a first interference avoidable range in which movements of the seat sections in directions reaching the interfering range are prohibited; and a second interference avoidable range, being set between the interfering range and the first interference avoidable range, in which a movement of one of the seat sections in any direction is prohibited, and a movement of another of the seat sections in a direction reaching the interfering range is prohibited.

6. The seat controlling mechanism according to claim 1, wherein the seat sections include a first seat section and a second seat section, and the interference avoidable range includes: a first interference avoidable range in which a movement of the first seat section toward a retracted position is prohibited, when each of the seat sections is moved to the retracted position; and a second interference avoidable range, being set between the interfering range and the first interference avoidable range, in which a movement of the first seat section toward the retracted position is prohibited, and a movement of the second seat section in any direction is prohibited.

7. The seat controlling mechanism according to claim 1, wherein the seat sections include a first seat section and a second seat section, and the interference avoidable range includes: a first interference avoidable range in which a movement of the second seat section toward a seating position is prohibited, when each of the seat sections is moved to the seating position; and a second interference avoidable range, being set between the interfering range and the first interference avoidable range, in which a movement of the second seat section toward the seating position is prohibited, and a movement of the first seat section in any direction is prohibited.

8. The seat controlling mechanism according to claim 7, wherein the first seat section is a seat back member and the second seat section is a seat cushion member.

9. The seat controlling mechanism according to claim 1, wherein the seat sections include a seat back member and a seat cushion member.

* * * * *